United States Patent

Matsui et al.

[11] Patent Number: 5,810,960
[45] Date of Patent: Sep. 22, 1998

[54] PAINT FILM-PROTECTIVE SHEET

[75] Inventors: Komaharu Matsui; Mitsuo Wakimoto; Takeshi Eda; Tadayoshi Tatsuno, all of Kanagawa; Tsuyoshi Inoue, Osaka; Kenichi Shibata, Osaka; Yutaka Kuwabara, Osaka; Tatsuo Wada, Osaka, all of Japan

[73] Assignees: Nitto Denko Corporation, Osaka; Kansai Paint Co., Ltd., Hyogo, both of Japan

[21] Appl. No.: 733,403

[22] Filed: Oct. 18, 1996

Related U.S. Application Data

[62] Division of Ser. No. 400,824, Mar. 8, 1995, abandoned.

[51] Int. Cl.⁶ ....................................................... B32B 7/12
[52] U.S. Cl. .......................... 156/305; 156/334; 156/338
[58] Field of Search ..................... 428/355, 343, 428/461, 356, 521, 497; 524/313; 427/208.4; 156/338, 327, 305, 334

[56] References Cited

U.S. PATENT DOCUMENTS

| | | | |
|---|---|---|---|
| 4,224,379 | 9/1980 | Ichinose et al. | 428/461 |
| 5,089,267 | 2/1992 | Hille et al. | 424/449 |
| 5,266,394 | 11/1993 | Diehl et al. | 428/261 |
| 5,612,135 | 3/1997 | Matsui et al. | 428/343 |

FOREIGN PATENT DOCUMENTS

| | | |
|---|---|---|
| 0519278 | 12/1992 | European Pat. Off. . |
| 2045618 | 11/1980 | United Kingdom . |
| WO9324547 | 12/1993 | WIPO . |

OTHER PUBLICATIONS

Encyclopedia of Polymer Science and Engineering vol. 13, pp. 345–353 1985.

*Primary Examiner*—Paul J. Thibodeau
*Assistant Examiner*—D. Lawrence Tarazano
*Attorney, Agent, or Firm*—Sughrue, Mion, Zinn, Macpeak & Seas, PLLC

[57] ABSTRACT

An adhesive-backed sheet for protecting painted surfaces comprising a supporting substrate having formed thereon a rubber-based pressure-sensitive adhesive layer compounded with a fatty acid glycerol ester.

5 Claims, 1 Drawing Sheet

PAINT FILM-PROTECTIVE SHEET

This is a Continuation of application Ser. No. 08/400,824 filed Mar. 8, 1995 now abandoned.

FIELD OF THE INVENTION

The present invention relates to an adhesive-backed sheet for protecting painted surfaces, which prevents a paint film from deforming and is suitable for the surface protection of automobile bodies and parts, coated steel plates, etc.

BACKGROUND OF THE INVENTION

In the case of loading trucks or ships with coated automobiles, the parts thereof, etc., and transporting those to remote places such as overseas, an effective means is desired to prevent the paint films of the automobiles, etc., from being damaged, dulled, discolored, etc., by various suspended matters such as dusts or rains, or impinging matters.

Hitherto, a method of applying a coating material comprising a wax as the main component at a thickness of from 5 to 40 $\mu$m has been known as such a prevention means.

However, this method has various problems such that it is difficult to form the wax coating at a uniform thickness, whereby a uniform protection of the paint film is not obtained; the coated layer is liable to be stained and has a poor resistance to acidic rain; the wax and the like penetrate into the paint film to cause discloration or other defects; the formation and the removal of the wax coating require much labors; and the use of a solvent, the treatment of waste liquids, etc., are liable to cause environmental problems.

On the other hand, various surface protective sheets comprising a substrate having formed thereon a pressure-sensitive adhesive layer are known, and a surface protective sheet comprising a substrate having formed thereon a radiation-curable pressure-sensitive adhesive layer having a lowered glass transition point (Tg) is proposed for use on adherends having a paint film as disclosed in JP-A-2-199184 (the term "JP-A" as used herein means an "unexamined published Japanese patent application"). Such a sheet system can overcome the problems described above.

However, where such a surface protective sheet is adhered to the surface of the paint film of an automobile or the like, low molecular weight components contained in the paint film, such as a fatty acid glycerol ester, migrate into the surface protective sheet side due to a temperature rise in the outdoor transportation, whereby a step mark phenomenon occurs in the paint film to cause a problem that the adhesive marks of the protective sheet clearly appear on the surfaces of the paint film. In particular, in a low Tg type paint film, the adhered traces having a depth of from about 0.1 to 0.5 $\mu$m usually occur during the adhesion of the protective sheet for about 10 hours under 50° C.

The present inventors have previously proposed a surface protective sheet in which a rubber-based polymer such as a polyisobutylene is used as a pressure-sensitive adhesive (EP 0 519 278 A2). This sheet prevents the paint film from deforming and does not leave the adhesive on the painted surface. Thus, this sheet is a practical surface protective sheet. However, this sheet has in some cases a problem that the adhesive marks may not completely be eliminated where the paint film contains a fatty acid glycerol ester.

SUMMARY OF THE INVENTION

Accordingly, an object of the present invention is to provide a paint film-protective sheet which can prevent the occurrence of the step marks as illustrated in the Figure onto a paint film by the migration of the low molecular weight components contained in the paint film into the paint film-protective sheet even in the case of being accompanied by the temperature rise in the outdoor transportion of automobiles, etc., whereby the adhesive marks of the protective sheet are not formed on the surface of the paint film, and is excellent in the protective property for paint films and in the releasing property without leaving the pressure-sensitive adhesive which becomes a staining material.

According to the present invention, there is provided a paint film-protective sheet comprising a supporting substrate having formed thereon a rubber-based pressure-sensitive adhesive layer compounded with a fatty acid glycerol ester.

DETAILED DESCRIPTION OF THE INVENTION

Figure 1:
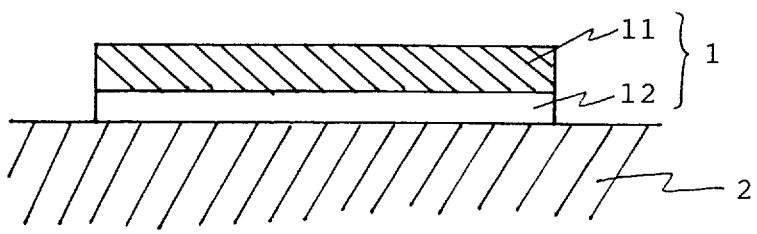
FIG. 1 is a view showing a state that a paint film-protective film 1 comprising a supporting substrate 11 and a pressure-sensitive adhesive layer 12 is adhered on a paint film 2.
Figure 2:
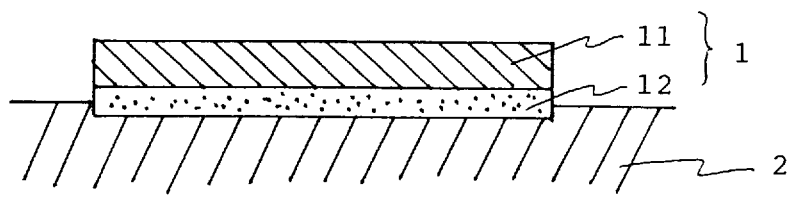
FIG. 2 is a view showing a state that low molecular weight components contained in a paint film 2 have migrated into a pressure-sensitive adhesive layer 12 of a paint film-protective sheet 1.
Figure 3:
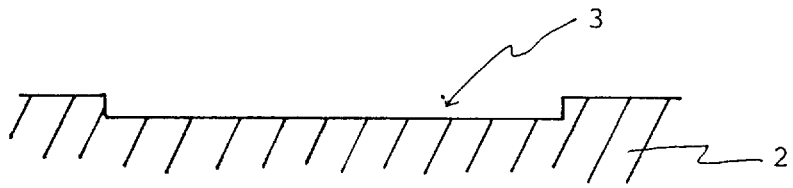
FIG. 3 is a view showing a state that a step mark 3 is formed on a paint film 2 after removing a paint film-protective sheet 1.

The present invention is described in detail below.

In the present invention, by using the rubber-based pressure-sensitive adhesive compounded with a fatty acid glycerol ester, the migration of the low molecular weight components in a paint film into the protective sheet can be prevented even in the case of involving the temperature rise in an outdoor transportation of automobiles, etc., and the step mark phenomenon of the paint film does not occur, whereby the adhesive marks of the protective sheet are not formed on the surface of the paint film. Further, the paint film-protective sheet of the present invention is excellent in the protective property for the paint film in the state that the protective sheet is adhered thereon, and also can be easily released from the paint film without leaving the pressure-sensitive adhesive which becomes a staining material on the paint film.

The paint film-protective sheet of the present invention has on a supporting substrate a rubber-based pressure-sensitive adhesive layer compounded with a fatty acid glycerol ester.

The supporting substrate used in the present invention can be any appropriate material, and examples thereof are plastic films, porous films, papers, nonwoven fabrics, etc. The thickness of the supporting substrate is generally 300 $\mu$m or less, and preferably from 10 to 100 $\mu$m, although the invention is not limited to the thickness.

The pressure-sensitive adhesive layer can be formed by using an appropriate rubber-based pressure-sensitive adhesive comprising one or more kinds of rubber-based polymers such as natural rubber, polyisobutylene, an A-B-A block copolymer, etc., as the main components and, if necessary, a tackifier or a softener. Further, the pressure-sensitive adhesive layer may contain appropriate additives such as a filler, a pigment, an antioxidant, a stabilizer, etc.

Examples of the more preferred rubber-based polymer from the point of the stability of the performance of the paint film-protective sheet over a long period of time are a non-curable polyisobutylene-based polymer and an A-B-A block copolymer comprising a polystyrene block, an ethylene-butylene copolymer block, and a polystyrene block. Further, the polyisobutylene-based polymer which is preferably used is a mixture of a high molecular weight type polymer having a viscosity average molecular weight of at least 100,000 and a low molecular weight type polymer having a viscosity average molecular weight of less than 100,000 at a weight ratio of 95:5 to 80:20.

The tackifier or the softener which may be contained in the rubber-based pressure-sensitive adhesive can be any appropriate material, but the tackifier or the softener having a good compatibility with the rubber-based polymer is preferred. In general, Examples of the tackifier are hydrocarbon resins, alkylphenol resins, and terpene resins.

Examples of the softener generally used are a polyisobutylene having a low molecular weight when the rubber-based polymer is a polyisobutylene, and a paraffin oil when the rubber-based polymer is the A-B-A block copolymer.

Examples of the fatty acid glycerol ester to be compounded with the rubber-based pressure-sensitive adhesive layer in the present invention are a (mono, di, or tri)capric acid glycerol ester, a (mono, di, or tri)lauric acid glycerol ester, a (mono, di, or tri)myristic acid glycerol ester, and coconut oil. Of those, coconut oil is preferably used.

The fatty acid glycerol ester is used in the state that it is compounded with the rubber-based pressure-sensitive adhesive, and the compounding amount thereof is appropriately determined by the thickness of the pressure-sensitive adhesive layer formed. When the pressure-sensitive adhesive layer having a thickness of 15 $\mu$m is a standard, the compounding amount of the fatty acid glycerol ester is from 0.5 to 20 parts by weight, and preferably from 3 to 10 parts by weight, per 100 parts by weight of the rubber-based pressure-sensitive adhesive. If the compounding amount is over 20 parts by weight, it sometimes happens that the fatty acid glycerol ester bleeds on the surface of the pressure-sensitive adhesive layer to stain the surface of the paint film. On the other hand, if the compounding amount of the fatty acid glycerol ester is less than 0.5 part by weight, the addition effect thereof is poor and the adhesive marks are liable to form.

The paint film-protective sheet of the present invention can be formed according to a conventional method of forming an adhesive sheet, such as a method of coating a supporting substrate with a solution of the rubber-based pressure-sensitive adhesive compounded with the fatty acid glycerol ester or a hot-melt liquid of the rubber-fatty acid glycerol ester, or a method of transferring the pressure-sensitive adhesive layer formed on a separator onto a supporting substrate, etc.

The thickness of the pressure-sensitive adhesive layer formed may be appropriately determined, but is generally 200 $\mu$m or less, and preferably from 5 to 50 $\mu$m. The pressure-sensitive adhesive layer is, if necessary, protected by pre-fixing thereto a separator, etc., before use.

The paint film-protective sheet of the present invention is advantageously used to protect the surfaces of articles having a paint film, such as bodies and parts of automobiles coated with a paint film such as a melamine-alkyd type, melamine-acryl type or urethane type paint film, or metal plates (such as steel plates) or the shaped articles thereof coated with the paint film, from impinging of fine matters, chemicals, etc. In particular, the paint film-protective sheet of the present invention can be advantageously used in the case which involves the temperature rise as in the case of the outdoor transporting of the automobiles, etc., or in the case that the paint film-protective sheet is adhered to paint films of automobiles, etc., over a long period of time.

The present invention is described below in more detail by reference to the following examples and comparative examples, but it should be understood that the invention is not construed as being limited thereto. Unless otherwise indicated, all percents, parts, ratio and the like or by weight.

EXAMPLE 1

To a toluene solution of a rubber-based pressure-sensitive adhesive composed of a mixture of 75 parts of a polyisobutylene having a viscosity average molecular weight of 1,000,000 and 25 parts of a polyisobutylene having a viscosity average molecular weight of 80,000 was added 5 parts of coconut oil followed by compounding. The resulting liquid was coated on a film having a thickness of 40 $\mu$m composed of polypropylene and polyethylene (9/1 by weight ratio), and dried at 80° C. for 2 minutes to obtain a paint film-protective sheet having a pressure-sensitive adhesive layer having a thickness of 15 $\mu$m.

EXAMPLE 2

A paint film-protective sheet was obtained in the same manner as in Example 1 except that the compounding amount of coconut oil was changed to 10 parts.

EXAMPLE 3

A paint film-protective sheet was obtained in the same manner as in Example 1 except that the compounding amount of coconut oil was changed to 20 parts.

EXAMPLE 4

A paint film-protective sheet was obtained in the same manner as in Example 1 except that trilauric acid glycerol ester was used in place of coconut oil.

EXAMPLE 5

A paint film-protective sheet was obtained in the same manner as in Example 1 except that a mixture of 100 parts of an A-B-A block copolymer comprising a polystyrene block, an ethylene-butylene copolymer block, and a polystyrene block (Kraton G-1657, trade name, made by Shell Chemical Co.) and 40 parts of a hydrogenated petroleum resin (Arcon, trade name, made by Arakawa Chemical Industries, Ltd.) was used as the rubber-based pressure-sensitive adhesive.

COMPARATIVE EXAMPLE 1

A paint film-protective sheet was obtained in the same manner as in Example 1 except that coconut oil was not compounded.

COMPARATIVE EXAMPLE 2

A paint film-protective sheet was obtained in the same manner as in Example 1 except that the compounding amount of coconut oil was changed to 30 parts.

EVALUATION TESTS

Each of the paint film-protective sheets obtained in the examples and the comparative examples was subjected to the following tests.

Adhesive Remaining:

The paint film-protective sheet was adhered at room temperature to a plate having an alkyd-melamine paint film having a glass transition point of 60° C. and containing the fatty acid glycerol ester. The resulting plate was placed in an atmosphere of 80° C. for 24 hours, taken out therefrom, and then allowed to stand at room temperature for 3 hours. Thereafter, the paint film-protective sheet was stripped off, and the presence of the pressure-sensitive adhesive remained on the paint film of the plate, in particular, the presence of the pressure-sensitive adhesive remained on the portion of the paint film of the plate corresponding to the peripheral portion of the paint film-protective sheet was examined.

Adhesive Mark:

The alkyd-melamine paint film after the above adhesive remaining test was observed, and the presence of the adhesive marks in the paint film, in particular, the presence of the adhesive marks in the portion corresponding to the peripheral portion of the paint film to which the paint film-protective sheet had been adhered was visually examined. In this test, when the adhesive mark (concaved portion) of the paint film caused by the migration of the fatty acid glycerol ester contained in the alkyl-melamine paint film into the paint film-protective sheet was not observed, the case was evaluated as "none" and when such an adhesive mark was observed, the case was evaluated as "found".

The results obtained are shown in the table below.

TABLE

|  | Example | | | | | Comparative Example | |
| --- | --- | --- | --- | --- | --- | --- | --- |
|  | 1 | 2 | 3 | 4 | 5 | 1 | 2 |
| Adhesive Remaining | None | None | None | None | None | None | None |
| Adhesive Mark | None | None | None | None | None | Found | Found |

According to the paint film-protective sheet of the present invention, even in the case that the glass transition point of a paint film is low and a temperature of the paint film rises, the migration of the low molecular weight components in the paint film into the paint film-protective sheet adhered onto the paint film can be prevented, whereby the occurrence of the step mark phenomenon of the paint film can be prevented and the adhesive marks of the protective sheet are not formed on the surface of the paint film. Further, the paint film-protective sheet of the present invention is excellent in the paint film-protecting property in the adhered state and can be easily released from the paint film without leaving thereon the pressure-sensitive adhesive which becomes a staining material.

While the invention has been described in detail and with reference to specific embodiments thereof, it will be apparent to one skilled in the art that various changes and modifications can be made therein without departing from the spirit and scope thereof.

What is claimed is:

1. A method for the protection of a painted surface containing a low molecular weight component comprising a fatty acid glycerol ester, which comprises covering the painted surface with a sheet for protecting a painted surface, said sheet comprising a substrate upon which is formed a rubber pressure-sensitive adhesive layer compounded with a fatty acid glycerol ester, wherein the fatty acid glycerol ester is compounded in an amount of from 0.5 to 20 parts by weight per 100 parts by weight of the rubber pressure-sensitive adhesive.

2. A method as claimed in claim 1, wherein the fatty acid glycerol ester is compounded in an amount of from 3 to 10 parts by weight per 100 parts by weight of the rubber pressure-sensitive adhesive.

3. A method as claimed in claim 1, wherein the fatty acid glycerol ester is selected from the group consisting of a (mono, di or tri)capric acid glycerol ester, a (mono, di or tri)myristic acid glycerol ester, and a coconut oil.

4. A method as claimed in claim 1, wherein the fatty acid is coconut oil.

5. A method as claimed in claim 1, wherein the rubber pressure-sensitive adhesive comprises a non-curable polyisobutylene polymer or an A-B-A block copolymer comprising a polystyrene block, an ethylene-butylene copolymer block, and a polystyrene block as the main component.

\* \* \* \* \*